United States Patent [19]
Krygowski

[11] 3,841,284
[45] Oct. 15, 1974

[54] EXHAUST GAS HEATED ENGINE INTAKE MANIFOLDING AND FUEL VAPORIZER

[75] Inventor: Richard P. Krygowski, Livonia, Mich.

[73] Assignee: Ford Motor Company, Dearborn, Mich.

[22] Filed: Mar. 22, 1973

[21] Appl. No.: 343,745

[52] U.S. Cl............. 123/122 A, 123/52 MV
[51] Int. Cl............................. F02m 33/00
[58] Field of Search... 123/122 A, 122 AC, 122 AB, 123/52 MV, 141

[56] References Cited
UNITED STATES PATENTS

| | | | |
|---|---|---|---|
| 1,676,955 | 7/1928 | Kemp | 123/122 AC |
| 1,678,045 | 7/1928 | Hill | 123/122 AC |
| 1,697,795 | 5/1923 | Summers | 123/122 AC |
| 1,734,723 | 11/1929 | Gildehaus | 123/122 AC |
| 2,713,857 | 7/1955 | Keydel | 123/122 A |
| 2,745,394 | 5/1956 | Holley | 123/122 AC |
| 3,520,284 | 7/1970 | Ruoff | 123/52 MV |
| 3,678,905 | 7/1972 | Diehl | 123/52 MV |

Primary Examiner—Charles J. Myhre
Assistant Examiner—R. H. Lazarus
Attorney, Agent, or Firm—Robert E. McCollum; Keith L. Zerschling

[57] ABSTRACT

An engine intake manifold has an exhaust gas crossover passage that passes between the manifold carburetor riser bores and the manifold outlets to the engine cylinders; the riser bores are connected by thin sheet metal high heat transfer tubes that pass through the crossover passage so that the exhaust gases flow around the walls of the connecting portions of the tubes and vaporize any raw fuel running down the tube walls; the tubes have liquid fuel dams at their lower closed ends to trap liquid fuel and minimize passage of it to the engine cylinders, and conical deflectors to move liquid fuel from the walls into the air stream; additionally, insulating liners are placed in the inlet and outlet of the crossover passage to conserve heat.

6 Claims, 5 Drawing Figures

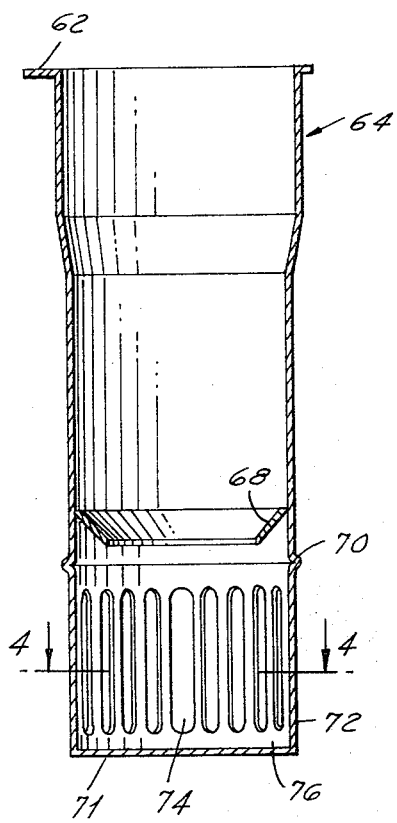
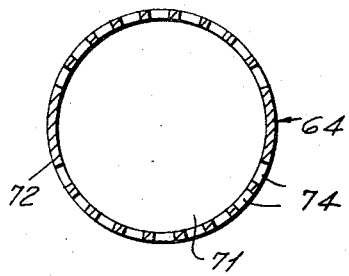
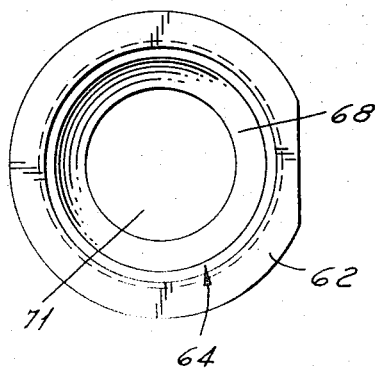
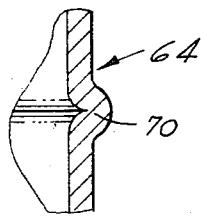

EXHAUST GAS HEATED ENGINE INTAKE MANIFOLDING AND FUEL VAPORIZER

This invention relates in general to an intake manifold of an internal combustion engine. More particularly, it relates to the construction of the manifold to provide quick heat to the fuel mixture passing through it to the engine cylinders.

Engine constructions are known in which hot exhaust gases at times warm or heat the bottom wall of the cast iron intake manifold beneath the carburetor throttle riser bores. This provides a so-called hot spot to vaporize any liquid fuel that may be running down the bore walls as well as fuel droplets present in the carburetor air/fuel mixture. The result provides more efficient cold engine operation and also minimizes the choking requirements of the engine.

In the past, these constructions, in a V-8 engine, for example, generally have consisted of an additional cast passage connecting a pair of exhaust ports on opposite sides of the engine directly beneath the floor of the intake manifold under the carburetor throttle riser bores. See, for example, item 21 in FIG. 2 of Porter, U.S. Pat. No. 1,998,636.

However, since the floor of the intake manifold, like the rest of the engine, generally was of high thermal inertia cast iron, this resulted in only the slow transmittal or radiation of heat from the exhaust gases to the upper surface of the intake manifold wall or floor. That is, it was necessary to heat essentially the entire length of the lower wall of the intake manifold and not just the hot spot area before the upper surface which the fuel contacted was hot enough to vaporize the fuel.

This, of course, resulted in the engine operating under rich mixture choking conditions for a longer period than is desirable for both engine operating efficiency and good emission control.

Accordingly, it is a primary object of the invention to provide an engine intake manifold construction that will more quickly vaporize liquid fuel in the carbureted fuel/air mixture.

Another object of the invention is to provide an internal combustion engine with thin sheet metal, rapid heat transfer tubes connecting spaced inlet and outlet portions of the intake manifold through an exhaust gas crossover passage for the rapid transfer of the exhaust gas heat to the incoming air/fuel mixture.

A still further object of the invention is to provide an engine construction of the type described above in which the intake manifold carburetor riser bores are connected to the manifold outlets by thin sheet metal, rapid heat tranfer tubes that pass through an exhaust gas crossover passage, the walls of the tubes intermediate the end portions being surrounded by and heated by the exhaust gases.

Another object of the invention is to construct an intake manifold as described above and additionally provide the engine side end portions of the sheet metal tubes with liquid fuel dams to provide further fuel vaporization while minimizing the passage of liquid fuel to the engine cylinders.

A still further object of the invention is to provide an engine intake manifold construction having an exhaust gas containing passage in which the opposite terminal portions of the passage contain a thin sheet conduit insulated from the manifold walls for better heat conservation.

An additional object of the invention is to provide a manifold construction as described above with fuel deflecting means in the tubes to direct liquid fuel running down the tube walls away into the flow stream of the air/fuel mixture.

Other objects, features and advantages of the invention will become more apparent upon reference to the succeeding detailed description thereof, and to the drawings illustrating the preferred embodiment thereof; wherein, FIG. 1 is a cross-sectional view of a portion of an internal combustion engine with attached carburetor embodying the invention;

FIGS. 2 and 3 are enlarged views of details of FIG. 1,

FIG. 4 is a cross-sectional view taken on a plane indicated by and viewed in the direction of the arrows 4—4, of FIG. 2; and, FIG. 5 is an end view looking from the upper end of the FIG. 2 showing.

Figure 1:
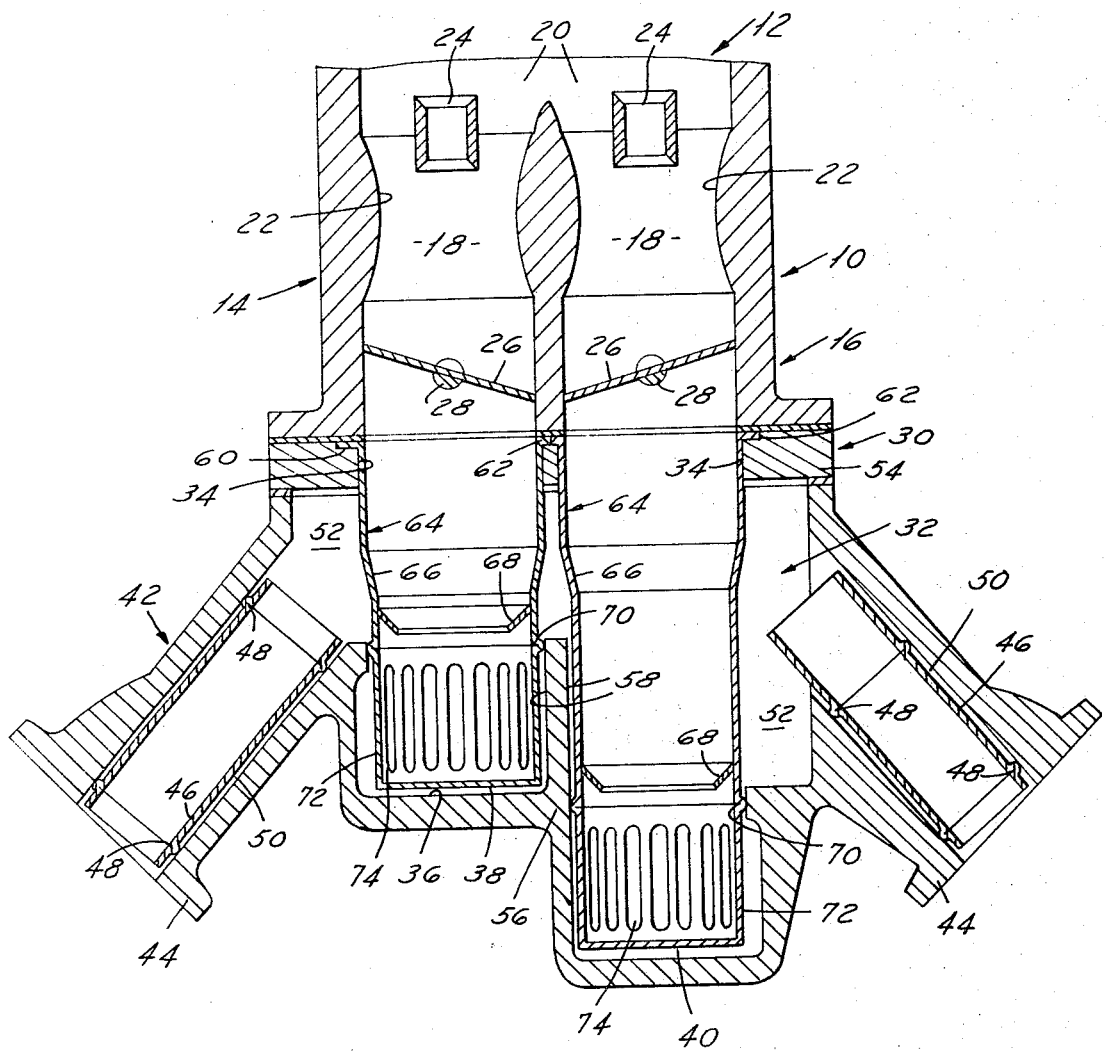

FIG. 1 illustrates a portion 10 of one-half of a carburetor of a known downdraft type. It has an air horn section 12, a main body portion 14, and a throttle body 16. It has the usual air/fuel induction passages 18 open at their upper ends 20 to fresh air from the conventional air cleaner, not shown. The passages 18 have fixed area venturiis 22 cooperating with booster venturiis 24 through which the main supply of fuel is inducted, by means not shown.

Flow of air and fuel through induction passages 18 is controlled by a pair of throttle valve plates 26 each fixed on a shaft 28 rotatably mounted in the side walls of the carburetor body.

Throttle body 16 is flanged as indicated for bolting to the top of the engine intake manifold 30, which is cast iron. Manifold 30 consists of a hollow chamber 32 with two inlet openings or riser bores 34 in its upper surface that are aligned for cooperation with the discharge end of the carburetor induction passages 18.

The riser bores 34 permit the flow of liquid fuel and the carbureted fuel/air mixture directly down into the intake manifold chamber 32. The lower portion 36 of the intake manifold is formed with a stepped construction providing two manifold passages 38 and 40. The two passages extend into and out of the plane of FIG. 1, respectively, for connection in a conventional manner with a number of manifold outlets or runners, not shown, leading to the engine cylinders. This forms the conventional over and under logs of the intake manifold, for supplying the air/fuel mixture to the respective cylinders.

It will be clear, therefore, that the fuel/air mixture is turned approximately 90° from its vertical direction to pass out opposite sides of the manifold to the banks of cylindres on opposite sides of the engine block.

The intake manifold is provided with a connection to the exhaust manifolding part of the engine, not shown, through a cast iron portion indicated at 42. The latter constitutes a separate exhaust gas crossover passage that passes through a portion of chamber 32. The construction is such that the hot exhaust gases will pass between a pair of exhaust ports, not shown, on opposite sides of the engine through the intake manifold chamber 32 directly beneath the riser bores 34 to vaporize the air/fuel mixture.

More specifically, passage 42 has a pair of bored end portions 44 each flanged for connection to an exhaust port. Each portion 44 contains a thin sheet metal gas conducting tube or liner 46 that has an annular bead 48 at opposite ends. The beads space the tubes from the cast iron walls, providing an insulating air space 50 between, to conserve the heat.

The upper terminal portions of tubes 46 are connected to each other by a chamber like passage 52 that passes across the intake manifold chamber 32 approximately at its midpoint. Passage 52 is a cast totally enclosed passage so as not to permit communication of the exhaust gases with the intake manifold mixture. This isolation of fluids is similar in principle, for example, to the crossover passage construction shown in U.S. Pat. No. 1,998,636, referred to above.

The purpose of the crossover passage is to warm the carburetor mixture and vaporize the liquid fuel. To this end, the intake manifold defining passage 52 is divided into two portions. An upper one 54 contains the bores 34, and a lower one 56 forms cup shaped pockets 58 connected to the intake manifold runners.

The upper surface of manifold 30 is recessed adjacent each bore 34 to provide annular shoulders 60. Seated against the shoulder in each bore is the flanged lip 62 of a long thin sheet metal tube or liner 64. The latter extend downwardly through passage 52 to the bottom of the manifold pockets 58 for guiding the fuel-/air mixture and liquid fuel into the manifold runners.

The tubes each are tapered at 66 to direct any liquid fuel running down the walls towards the center to mix with the air, and additionally contain frustoconical fuel deflectors 68 for the same purpose. The lower portions of each tube are beaded at 70, see FIG. 3, where the tube enters manifold portion 56, to seal the passage 52 from the intake manifold passages 38 and 40.

The lower end or bottom 71 of each tube 64 is closed, and the adjacent walls 72 are serrated as shown best in FIG. 4 to provide a number of spaced slots 74 for passage of the air/fuel mixture into the engine. It is to be noted that the lower portions of slots 74 are spaced vertically from the bottom 71 to provide a clearance space or area between constituting a liquid fuel dam 76 that will collect liquid fuel running down the tube walls or precipitated out of the mixture. This further aids the vaporization of fuel and minimizes the passage of fuel in a liquid state to the engine cylinders.

From the above, it will be clear that the tubes 64 connect and guide the carbureted mixture and liquid fuel down through the crossover passage 52 to the manifold runners. The intermediate portions of the tubes 64 connect the two spaced portions 54 and 56 of the manifold, preventing communication between the exhaust gases and the mixture. The crossover passage, on the other hand, flows exhaust gases freely into contact with and around the intermediate portions of the tubes 64.

It will be seen, therefore, that the hot exhaust gases will rapidly radiate their heat to the walls of tubes 64; and that, therefore, the liquid fuel particles will be quickly vaporized because of a maximum rate of heat transfer between the exhaust gas and the intake charge. The necessity for a conventional choke fuel enrichment system, therefore, is essentially eliminated, with resultant reduction in the emission of unburned hydrocarbons. The raw fuel flowing against the tube is vaporized and mixed with inlet air in the conical mixing sections to provide the engine with a combustible charge without additional enrichment only seconds after a start.

An added advantage of the sheet metal tube heaters over the conventional cast iron plate or lower manifold wall is heat dissipation upon engine shutdown. The conventional cast iron intake manifold with cast iron floor at the hot spot acts as a heat sink during engine shutdown since the heat only slowly dissipates from it. Accordingly, hot engine restart problems may be encountered by too much fuel being vaporized during engine shutdown; that is, the heat from the crossover passage radiates to other parts of the engine and up through the carburetor walls to the fuel bowl. The fuel then vaporizes and can provide too rich a mixture for engine restart.

The thin sheet metal tubes 64 of the invention, on the contrary, have no ability to retain heat once the exhaust gas flow is cut off, and excess vaporization of fuel in the carburetor float bowl on engine shutdown, therefore, does not occur.

While the invention has been shown and described in its preferred embodiment, it will be clear to those skilled in the arts to which it pertains, that many changes and modifications may be made thereto without departing from the scope of the invention.

I claim:

1. An engine fuel vaporizer for use on an internal combustion engine having an intake manifold, exhaust manifolding, and a carburetor mounted on the intake manifold and having one or more air/fuel induction passages aligned so as to discharge an air/fuel mixture into the intake manifold, the intake manifold having a number of inlet openings in one plane corresponding to the number of carburetor induction passages and aligned with the induction passages to receive an air/fuel mixture therefrom for transmittal to the engine cylinders, the intake manifold also having in other planes essentially at angles to the one plane and spaced therefrom a number of air/fuel mixture outlets from the manifold corresponding to the number of engine cylinders, the improvement comprising:

a hollow thin sheet metal heat transfer tube mounted in each of the inlets and extending from the carburetor induction passage towards the manifold outlets, the intake manifold including an engine hot exhaust gas passage passing from one side of the manifold to the other, the intake manifold also including portions spaced from each other and interconnected by portions of the heat transfer tubes, the said portions passing through the exhaust gas passage whereby the gases pass around the interconnecting portions of the heat transfer tubes to transfer heat through the walls thereof to vaporize liquid fuel therein, each tube having a closed cup shaped lower end portion with bottom and side walls and a number of openings in the side walls thereof, the openings being located axially a distance above the bottom wall to form a liquid fuel dam therebetween.

2. An engine fuel vaporizer for use on an internal combustion engine having an intake manifold, exhaust manifolding, and a carburetor mounted on the intake manifold and having one or more air/fuel induction passages aligned so as to discharge an air/fuel mixture into the intake manifold, the improvement comprising; a number of hollow thin sheet metal heat transfer tubes corresponding to the number of carburetor induction passages and mounted in the intake manifold and extending from and connecting the carburetor induction passages to a number of manifold outlets, each tube having a closed lower end portion with openings in the side wall thereof spaced axially from the end portion to provide a liquid fuel dam therebetween, the openings providing for the passage of air/fuel mixture therethrough on its way to the engine cylinders, the intake manifold including portions spaced from each other interconnected by the heat transfer tubes, the intake manifold also including an engine hot exhaust gas passage passing from one side of the manifold to the other around the interconnecting portions of the heat transfer tubes to transfer heat thereto to vaporize liquid fuel therein.

3. A fuel vaporizer as in claim 2, the end portions of the crossover passage for the entry and exit of the exhaust gases having thin sheet metal sleeve liners located therein spaced from the walls of the intake manifold to provide an air space therebetween for insulating the liners.

4. A fuel vaporizer as in claim 2, the tubes each including fuel deflecting means for guiding liquid fuel away from the walls of the tubes towards the center to mix with the air in the air/fuel mixture stream.

5. A fuel vaporizer as in claim 4, the fuel deflecting means including a hollow frustoconical member.

6. A fuel vaporizer as in claim 2, the fuel deflecting means including wall portions of the tube converging in an air/fuel mixture flow direction.

* * * * *